(12) United States Patent
Buseyne et al.

(10) Patent No.: US 9,513,186 B2
(45) Date of Patent: Dec. 6, 2016

(54) METHOD FOR DIAGNOSING A SINGLE-FLOW OR DUAL-FLOW VENTILATION UNIT AND ASSOCIATED VENTILATION UNIT

(71) Applicant: ALDES AERAULIQUE, Venissieux (FR)

(72) Inventors: Serge Buseyne, Toulouse (FR); Damien Labaume, Preserville (FR)

(73) Assignee: ALDES AERAULIQUE, Venissieux (FR)

(*) Notice: Subject to any disclaimer, the term of this patent is extended or adjusted under 35 U.S.C. 154(b) by 116 days.

(21) Appl. No.: 14/617,879

(22) Filed: Feb. 9, 2015

(65) Prior Publication Data

US 2015/0226631 A1    Aug. 13, 2015

(30) Foreign Application Priority Data

Feb. 10, 2014    (FR) ..................... 14 51007

(51) Int. Cl.
*G01M 3/28*     (2006.01)
*F24F 11/04*    (2006.01)
*F24F 11/00*    (2006.01)

(52) U.S. Cl.
CPC ........ *G01M 3/2815* (2013.01); *F24F 11/0001* (2013.01); *F24F 11/04* (2013.01); *G01M 3/2807* (2013.01); *G01M 3/2846* (2013.01); *F24F 2221/32* (2013.01)

(58) Field of Classification Search
CPC ............ F24F 11/0086; F24F 2011/0052; F24F 2011/0042; F24F 2011/0041; F24F 13/10; G05B 19/0428; G05B 19/0425; G01M 3/2815
See application file for complete search history.

(56) References Cited

U.S. PATENT DOCUMENTS

| | | | |
|---|---|---|---|
| 5,540,619 A | 7/1996 | Ahmed | |
| 5,705,734 A * | 1/1998 | Ahmed | F24F 11/0001 454/256 |
| 6,079,627 A * | 6/2000 | Kettler | F24F 11/04 236/49.3 |
| 6,981,383 B2 * | 1/2006 | Shah | F24F 3/0442 165/11.2 |
| 2005/0155365 A1* | 7/2005 | Shah | F24F 3/0442 62/186 |
| 2008/0135635 A1* | 6/2008 | Deng | F24F 3/1405 236/44 C |
| 2010/0163633 A1 | 7/2010 | Barrett et al. | |
| 2011/0287707 A1* | 11/2011 | Baik | F24F 13/14 454/333 |
| 2012/0253524 A1* | 10/2012 | Norrell | F24F 13/1426 700/277 |
| 2013/0282186 A1* | 10/2013 | Douglas | G05D 23/00 700/277 |
| 2014/0090408 A1* | 4/2014 | Norrell | F24F 11/0012 62/187 |

FOREIGN PATENT DOCUMENTS

| | | |
|---|---|---|
| EP | 2363656 A2 | 9/2011 |
| FR | 2811759 A1 | 1/2002 |

* cited by examiner

*Primary Examiner* — David A Rogers
(74) *Attorney, Agent, or Firm* — Cantor Colburn LLP

(57) ABSTRACT

A method for diagnosing a single flow or dual flow ventilation unit, the method making it possible to diagnose the permeability and installation of each conduit of the ventilation unit by means of measuring devices and a control unit.

10 Claims, 4 Drawing Sheets

Figure 1:
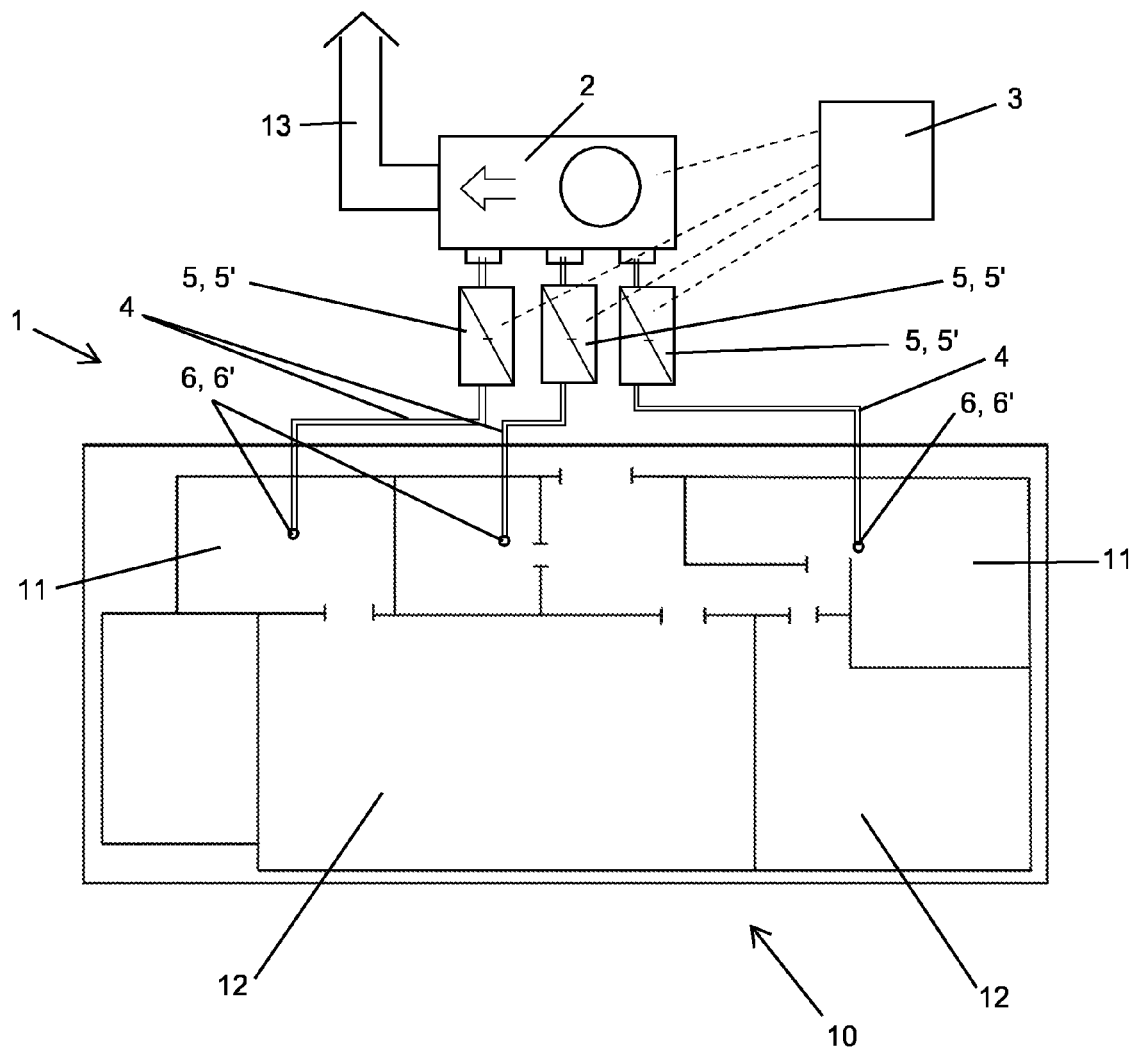

METHOD FOR DIAGNOSING A SINGLE-FLOW OR DUAL-FLOW VENTILATION UNIT AND ASSOCIATED VENTILATION UNIT

CROSS REFERENCE TO RELATED APPLICATION

This application is related to and claims the benefit of French Patent Application Number 14/51007 filed on 10 Feb. 2014, the contents of which are herein incorporated by reference in their entirety.

TECHNICAL FIELD

The invention relates to the domain of Controlled Mechanical Ventilation (CMV) equipment, and more particularly a method for diagnosing this equipment within the context of its installation in an apartment building or multi-dwelling building.

BACKGROUND

Traditionally these buildings are equipped with so-called "single flow" or "dual flow" systems enabling the rooms of the dwellings of the building to be ventilated in order to evacuate specific pollution related to the presence of the occupants and to evacuate the specific pollution related to the building itself.

A single flow system is understood to be a system that moves the air from the outdoors to the so-called main rooms, then to the utility rooms to be extracted by conduits and expelled by a blower to the outdoors.

A dual flow system is understood to be a system enabling the air to be moved from the outdoors as described in the previous paragraph and also enabling the intake of air by a blower via a system of conduits and intake vents.

Main rooms are understood to be the rooms of a dwelling, such as dining room, bedrooms, and living room, that only require indirect extraction of air.

Utility rooms are understood as the rooms of a dwelling requiring ventilation by extraction, such as toilets, kitchen, and bathroom.

When these single flow or dual flow systems are installed, a system of conduits is also installed for carrying and extracting the air and covering all the rooms of each dwelling of the building.

System of conduits is understood as a system comprising a plurality of conduits that are controlled and governed by the same ventilation unit.

In a known manner, the system of conduits is produced by an assembly of a plurality of components such as ducts, connectors, collars, etc. If these components are poorly assembled, it can cause parasite flows that can increase heat loss and disrupt the distribution of the ventilation, thus putting the quality of ventilation of some rooms of the dwelling at a disadvantage.

Furthermore, a poor arrangement of the conduits can cause the crushing or gashing of the ducts, preventing the desired airflow from reaching the vents of the conduits.

Conventionally, in order to mitigate the aforementioned disadvantages, when the system is installed, different measuring devices are used to verify the permeability of the conduits and to ensure that the proper flow rates are obtained.

The flow rate is often difficult to control because the measuring devices are cumbersome and do not allow the extraction and/or intake vents to be reached since access to them is often very restricted.

Moreover, the devices for measuring the permeability of the system of conduits require that a specialized operator temporarily dismantle certain conduits in the system in order to measure the permeability of a conduit, which increases the risk of damage to the conduits, and repetitive handling causes a drop in the initial performance of each conduit.

Furthermore, the measuring devices previously described are very expensive and installers rarely have them available.

The patent FR 2,811,759 B1 describes an airtightness measuring method that makes it possible to measure the overall permeability of the system of conduits by means of a pressure gauge and a flow meter positioned inside the blower housing respectively upstream and downstream from the blower. However, this method does not allow a precise measurement, conduit by conduit, nor does it make it possible to identify which conduit is permeable if a defect is found. In addition, this method no longer makes it possible to control the airflow to each extraction and/or intake vent of the conduit system, in order to verify the proper installation of the conduit system.

Patent application EP 2,363,656 A2 describes a presetting method for carrying out an optimized setting of the different dampers of the conduits in order to obtain a preset airflow. However, this method does not make it possible to measure the permeability of each conduit and particularly between the damper and the extraction and/or intake vent of each conduit, which makes it impossible to identify a permeability problem or to ensure that the vent output flow rate corresponds to the upstream preset flow rate.

BRIEF SUMMARY

A diagnostic method for a ventilation unit is provided as comprising at least a blower, a discharge conduit, a system of conduits comprising at least two conduits, each comprising at least one extraction and/or intake air vent, at least one damper positioned in each conduit, a control unit adapted for controlling said damper, characterized in that the diagnostic method is carried out in at least one conduit and comprises the following steps:
  step A: providing at least one measuring device designed to measure the intake and outlet airflow from the damper in each conduit, said measuring device being controlled by the control unit,
  step B: blocking off the vent or vents of the conduit to be tested,
  step C: turning on the blower at a determined operating pressure,
  step D: measuring the airflow of the conduit by means of the measuring device,
  step E: determining the actual load loss of the damper,
  step F: determining the actual pressure of the conduit by subtracting the actual load loss of the damper from the determined operating pressure applied at the blower.
  step G: determining the leakage flow rate value of the conduit based on the actual pressure of the conduit determined in step F and from the airflow of the conduit measured in step D.

Thanks to the diagnostic method of the invention, it is no longer necessary to use specific measuring devices outside the ventilation unit or specialized labor to diagnose the ventilation unit when it is being installed in a dwelling.

Moreover, since the diagnostic method of the invention is implemented for one conduit, said method makes it possible to precisely identify an airtightness defect in said conduit by determining a leakage flow rate value corresponding to the permeability of the conduit based on the actual pressure of the conduit determined in step F.

According to the invention, steps D to G can be repeated independently for each conduit of the ventilation unit, which makes it possible to determine which conduit is defective, if any.

Advantageously, the leakage flow rate value of the conduit is expressed in m3/hr below the actual pressure of the conduit determined in step F.

According to one characteristic of the invention, the determination of the actual load loss of the damper performed in step E is accomplished by:
  E1: measuring the rate of airflow in the conduit by means of the measuring device,
  E2: determining the angular position of the damper under the control of the control unit of the ventilation unit, and
  E3: calculating the resulting load loss based on the flow rate measured in E1 and the position of the flap measured in E2.

Alternatively, the actual load loss of the damper can be measured directly on either side of the damper by means of the measuring device.

According to another characteristic of the invention, the diagnostic method comprises the following additional steps:
  step H: turning on the blower at a specific operating pressure,
  step I: repeating steps D, E, F and G
  step K: determining an equation characterizing the permeability of the conduit from the different leakage flow rate values obtained in each repetition of step G.

According to the invention, for greater precision in the permeability diagnosis, the method comprises a step J performed prior to step K and comprising repeating steps H and I. Advantageously, the more steps H and I are repeated, the more accurate will be the permeability equation determined in step K.

For a clear comprehension of the invention, several definitions of terms used are set forth below:
  determined operating pressure corresponds to the applied pressure at the blower,
  actual load loss of the damper corresponds to the load loss measured at the conduit and established either from a calculation based on flow rate measurements or based on an actual measurement of the load loss,
  actual pressure of the conduit corresponds to the pressure in the conduit and is established either from a calculation during the diagnostic method or from a direct measurement,
  leakage flow rate value corresponds to a value enabling the permeability rate of the conduit to be identified,
  the equation characterizing the permeability of the conduit corresponds to an equation for establishing a specific leakage flow rate of the conduit.

According to another characteristic of the invention, the diagnostic method is performed for a system of conduits of the ventilation system, each conduit of the system being diagnosed independently.

According to another characteristic of the invention, the method is performed for each conduit of the ventilation system and comprises a step K' of identifying the permeability class of the ventilation system from the permeability equation of each conduit produced in step K and from the dimensions of each conduit.

According to one characteristic of the invention, the diagnostic method comprises the following additional steps:
  step L: opening the vent or vents of the conduit to be tested, or verifying that the vent or vents of the conduit are open,
  step M: sending a setting to a damper of the conduit to be tested, corresponding to a theoretical total flow rate of the conduit,
  step N: determining a theoretical operating pressure of the ventilation unit by adding to a theoretical pressure of the conduit subject to the theoretical total flow rate of the conduit according to step M, a theoretical load loss of the damper of said conduit not subject to the theoretical total flow rate of the conduit,
  step O: turning on the blower so as to reach the theoretical total flow rate of the conduit and the theoretical operating pressure of the ventilation unit determined in step N,
  step P: comparing the actual load loss of the damper as determined in step E with the theoretical load loss of the damper; when the actual load loss of the damper is less than the theoretical load loss, a defect in the vent or vents of the tested conduit or in the conduit is identified.

Preferably, the theoretical load loss of the damper is substantially equal to 30 Pa.

According to the invention, the theoretical total flow rate of the conduit is determined while taking into account the usage of the ventilation unit. For example, for a conduit serving a bathroom, the theoretical total flow rate can be substantially 30 m$^3$/hr, while for a similar conduit serving a kitchen, the theoretical flow rate for this conduit is substantially 135 m$^3$/hr. Of course, these values are provided by way of example and do not limit the invention in any way.

According to another characteristic of the invention, the diagnostic method comprises the following steps:
  step Q: sending another setting corresponding to the theoretical total flow rate of the conduit according to step M, to which is added a leakage flow rate determined in step G or K subject to the determined theoretical pressure of the conduit according to step N.
  step R: repeating steps N and Q until a balance between the theoretical pressure of the conduit and the theoretical total flow rate of the conduit is reached.

steps Q and R are preferably performed successively between steps N and O.

Steps Q and R are preferably performed when the leakage flow rate value determined in step G or K is greater than substantially 2 m$^3$/hr under pressure of 30 Pa.

According to another characteristic of the invention, the method can comprise an additional step M' comprising sending a so-called low theoretical total flow rate setting to the other dampers of the other conduits of the ventilation unit. Low theoretical total flow rate is understood as being a low theoretical total flow rate lower than the theoretical total flow rate used on the conduit to be tested. Said step M makes it possible to control the theoretical total flow rate of the conduit to be tested, the low theoretical total flow rate setting preferably being done substantially at the same time as step M. Preferably, the low theoretical total flow rate setting is substantially on the order of 10 m$^3$/hr.

For a clear comprehension of the invention, several definitions of terms used are set forth below:

theoretical total flow rate of the conduit corresponds to a maximum flow rate passing through the conduit at the vent or vents of the conduit, theoretical operating pressure of the ventilation unit corresponds to the pressure applied at the blower and determined theoretically, theoretical pressure of the conduit corresponds to the assumed pressure within the conduit, theoretical load loss of the damper of said conduit corresponds to the assumed load loss of the damper, said assumption being based on the type of damper and the dimensions thereof, balance between the theoretical pressure of the conduit giving the theoretical total flow rate of the conduit taking leakage into account is reached when the theoretical pressure of the conduit gives the same leakage flow rate.

According to one characteristic of the invention, steps L to P, including or excluding steps Q and R, can be repeated for each damper of each conduit.

Advantageously, steps L to P, including or excluding steps Q and R, can be performed after step G or after step K or K'.

According to one characteristic of the invention, the method comprises an evaluation of the discharge of the ventilation unit by verifying that a theoretical total flow rate is obtained at the ventilation unit as compared to a predetermined theoretical total flow rate. The evaluation of the discharge makes it possible to verify if there is a problem at the discharge conduit of the ventilation unit.

According to one characteristic of the invention, the diagnostic method comprises the following steps:

step S: sending a setting grouping together all of the theoretical total flow rate settings sent to each damper of each conduit according to step M, step T: determining the theoretical pressure of each conduit subject to the theoretical total flow rate of each conduit, step U: identifying the most disadvantaged conduit of the system by comparing the actual pressure determined for each conduit in step F, the conduit having the highest actual pressure being the most disadvantaged conduit of the system, step V: calculating the theoretical pressure of the ventilation unit by adding a theoretical load loss of the damper of the most disadvantaged conduit, the theoretical load loss being subject to the theoretical pressure of the most disadvantaged conduit, step W: adding all of the theoretical total flow rate settings of each damper to a set of leakage flow rates for each conduit according to step G or K, each leakage flow rate being subject to the theoretical operating pressure of the ventilation unit, step X: turning on the blower in order to obtain all of the theoretical total flow rate settings of each damper and the theoretical pressure, step Y: comparing the actual load loss of the damper of the most disadvantaged conduit with the theoretical load loss of the damper of said most disadvantaged conduit; when the actual load loss of the damper of the most disadvantaged conduit is less than the theoretical load loss of the damper of the most disadvantaged conduit, then the discharge conduit of the ventilation unit is defective.

The diagnostic method can comprise an additional step Z comprising increasing the flow rate of the blower until the flow rates of each conduit are obtained in order to verify if the ventilation unit is correctly installed with respect to the predetermined criteria of standard conformity. Advantageously, step Z is performed after step Y.

Advantageously, step S is performed after step K or K' or after step P.

The invention also concerns a ventilation unit comprising at least a blower, a discharge conduit, a system of conduits comprising at least two conduits, each comprising at least one air extraction and/or intake vent, at least one damper positioned in each conduit, a control unit adapted for controlling said damper, characterized in that the ventilation unit comprises at least one measuring device designed to measure the air intake or outlet flow rate of the damper of each conduit, said measuring device being controlled by a control unit.

Advantageously, the measuring device is a flow meter. Preferably, at least one measuring device is incorporated in each damper.

According to the invention, the ventilation unit is designed to implement the diagnostic method described above when it is installed in a dwelling.

BRIEF DESCRIPTION OF THE INVENTION

Figure 2:
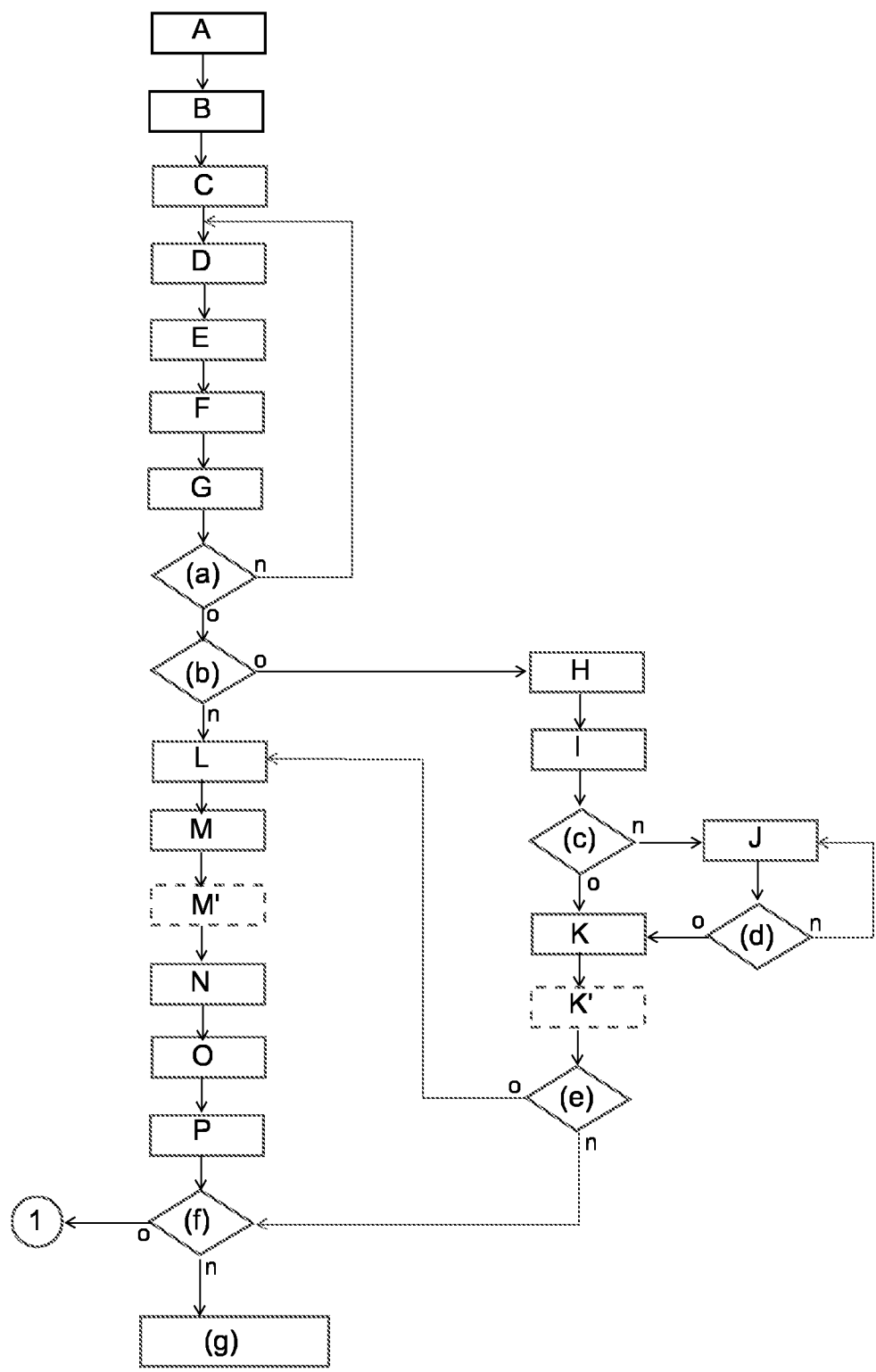
Figure 3:
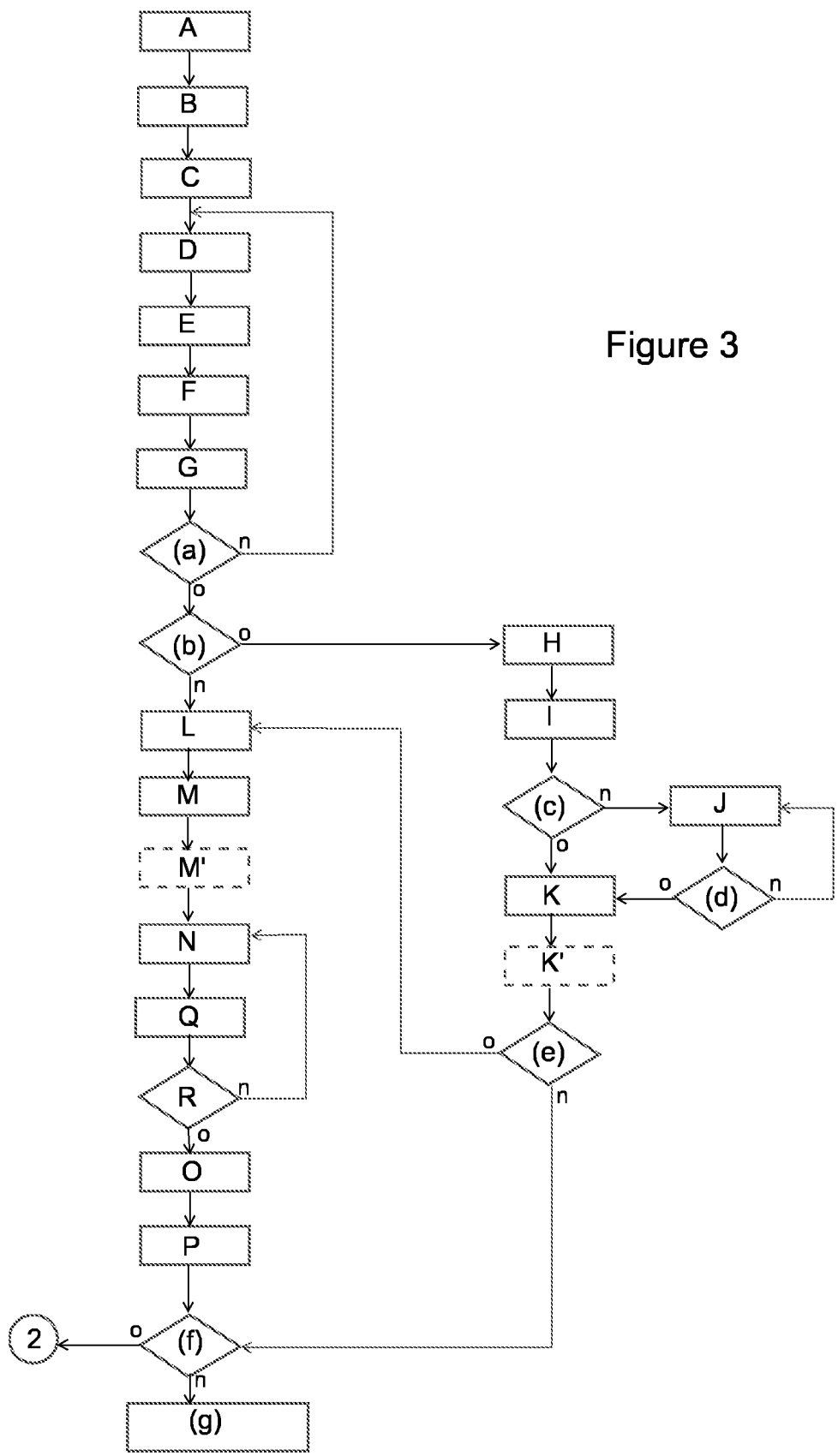
Figure 4:
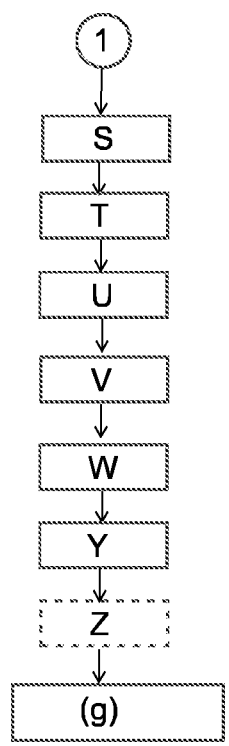
Figure 5:
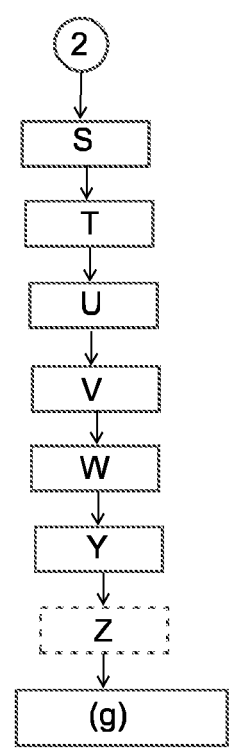

The invention will be better understood from the following description, which refers to two embodiments according to the present invention, provided by way of non-limiting example and explained with reference to the appended schematic drawings in which:

FIG. 1 is a schematic representation of a ventilation unit according to the invention, FIG. 2 is a flowchart representing the steps of the process according to a first embodiment of the invention, FIG. 3 is a flowchart representing the steps of the process according to a second embodiment of the invention, FIG. 4 is a flowchart representing optional steps according to the first embodiment represented in FIG. 2, and FIG. 5 is a flowchart representing optional steps according to the second embodiment represented in FIG. 3.

DETAILED DESCRIPTION

According to the invention, the ventilation unit 1 is designed to be installed in a dwelling 10 of a multi-dwelling building (not shown). The dwelling 10 comprises so-called utility rooms 11 and main rooms 12.

The ventilation unit 1 comprises a system of conduits cooperating with a blower 2 adapted to convey or extract air into or from the conduits 4. In the example illustrated in FIG. 1, only the utility rooms 11 are served by the conduits 4. Moreover, the ventilation unit comprises a discharge conduit 13 to evacuate the extracted air outside of the building.

Each conduit 4 comprises at least one damper 5 equipped with a flow meter type measuring device 5'. Furthermore, each conduit 4 comprises an air extract unit 6 or air intake unit 6' opening into a utility room 11 of the dwelling 10.

As illustrated in FIG. 1, the ventilation unit 1 comprises a control unit 3 that controls the dampers 5 and the flow meters 5' as well as the blower 2. Thanks to the control unit 3 of the ventilation unit 1, the method of diagnosing the operation described above according to the invention can be implemented and the dampers 5, the flow meters 5', and the blower 2 can be controlled in order to perform the diagnostic steps.

Advantageously, when the ventilation unit 1 is installed in a dwelling 10, the diagnostic method is implemented to determine if the installation of said ventilation unit 1 is in compliance with a determined standard and to ensure that there is no leakage.

In the representation of the steps of the diagnostic method in FIGS. 2 to 5, the steps (a) to (g) have been added to enhance comprehension of the method and the figures. Of course, these steps are in no way limiting.

Represented in FIG. 2 is a first embodiment of the diagnostic method. In this first embodiment the steps A to G are performed successively.

According to the example illustrated in FIG. 2, the ventilation unit 1 comprises at least a measuring device 5' designed to measure the airflow at the intake or outlet of the damper 5 in each conduit 4, which corresponds to step A. Next, the vents 6, 6' of a conduit 4 to be tested are blocked off (step B), the blower 2 is turned on at a determined operating pressure (step C), and the airflow at the conduit 4 is measured by means of the measuring device 5' (step D). Then the actual load loss of the damper 5 of the conduit 4 (step E) must be determined by means of the control unit 3, which makes it possible to determine the actual pressure of the conduit 4 (step F). In this way, the permeability of the conduit 4 can be determined (step G) based on the actual pressure of said conduit 4 and of the measured airflow of the conduit 4.

After steps A to G, a test step (a) is performed, which comprises determining whether these steps A to G have been reproduced for each conduit 4 of the system. If they have not, steps D, E, F and G are repeated. If they have, another test step (b) is performed.

The test step (b) comprises determining whether there is a need for accuracy about the leakage flow rate value of each conduit. If not, the method continues with steps L to P, which will be detailed hereinafter. If there is, steps H and I are performed.

After step I, a test step (c) is performed, comprising determining whether the level of accuracy about the value of the leakage flow rate of each conduit is sufficient. If it is, step K is performed to determine an equation characterizing the permeability. If it is not, step J is performed, comprising repeating steps letter H and I until the level of accuracy is considered to be sufficient (test step (d)) in order to move to step K. The decision with respect to the sufficiency of accuracy can be made based on a predetermined threshold level. When the threshold level is reached, step K can be performed. Advantageously, the threshold level is predetermined based on needs.

After step K or K', a new test step (e) is performed to determine if the diagnostic method should continue. If it should, the method continues with steps L to P, which will be detailed hereinafter. If not, a test step (f) is triggered to determine if a diagnosis of the discharge should be performed. If so, steps S to Y are performed—see FIG. 4. If not, the diagnostic method is stopped (step (g)).

According to the invention, steps A to G and preferably A to K or A' to K' enable the permeability of each conduit 4 of the conduit system to be evaluated.

After evaluation of the permeability, an evaluation is made to determine if the ventilation unit has been properly installed, and in particular when it is desired to determine whether the duct of the conduit 4 is crushed or has a shape that does not allow a proper airflow with respect to standards. In this way, the ventilation unit 1 implements steps L to P by using the results of the leakage flow rate values that were previously determined.

Steps L to P are performed successively. To do this, it is necessary to open the vent(s) 6 of the conduit 4 to be tested or to verify that the vents 6 of the conduit 4 are open, and to send a theoretical flow rate setting via the control unit 3 to a vent 5 of the conduit 4. A theoretical pressure of the ventilation unit 1 must then be determined by adding a theoretical load loss of the vent 5 of the conduit 4 and the value of the leakage flow rate of the conduit 4. Next, the blower 2 is turned on and the actual load loss of the damper 5 of the conduit 4 is determined. When the actual load loss of the vent 5 is less than the theoretical load loss, this means that there is a defect in the vent 6, 6' of the tested conduit 4 or in the conduit 4 itself.

Following step P, the test step (f) is triggered to determine if a diagnosis of the discharge should be performed. If so, steps S to Y are performed—see FIG. 4. If not, the diagnostic method is stopped (step (g)).

Represented in FIG. 3 is a second embodiment of the diagnostic method.

The second embodiment differs only from the first embodiment in that steps Q and R are integrated into the method between steps N and O. Steps Q and R make it possible to obtain the desired theoretical flow rate, taking the leakage into account. Step R is a test step that comprises finding out whether a balance between the theoretical pressure of the conduit 4 and the total theoretical flow rate of the conduit 4 has been reached. If so, the method continues with step O, and if not, the method loops back to step N until the balance that is sought is reached.

Following step P of the second embodiment, the test step (f) is performed to determine whether a diagnosis of the discharge should be performed. If so, steps S to Y or S to Z are performed—see FIG. 5. If not, the diagnostic method is stopped (step (g)).

Steps S to Y or S to Z optionally make it possible to determine whether the discharge conduit 13 of the ventilation unit 1 is in compliance with respect to standards. The ventilation unit 1 then implements the steps S to Y or S to Z of the diagnostic method.

The steps S to Y are carried out successively and end at the end-of-diagnostics step (g). Optionally, step Z is performed after step Y and before the end-of-diagnostics step (g). Represented in FIG. 4 is the evaluation of the discharge 13 following the first embodiment, while FIG. 5 represents the evaluation of the discharge 13 following the second embodiment. Steps S to Z remain unchanged irrespective of the embodiment.

Irrespective of the embodiment, steps K', M', and Z represented in broken lines in FIGS. 2 to 5 are considered to be optional.

The diagnostic method according to the invention can be used for a single flow ventilation unit as well as a dual flow ventilation unit. In a dual flow ventilation unit, the intake vents play the same role as the extraction vents and need to be blocked off during evaluation of the permeability, and opened during evaluation of the conduit in order to determine if the duct is crushed or defective.

Of course, the invention is not limited to the embodiments described and represented in the appended figures. Modifications remain possible, particularly from the point of view of the composition of the various elements or by substitution of technical equivalents, without thereby leaving the domain of protection of the invention.

The invention claimed is:

1. Diagnostic method for a ventilation unit comprising at least a blower, a discharge conduit, a system of conduits comprising at least two conduits each comprising at least one extraction and/or intake air vent, at least one damper positioned in each conduit, a control unit adapted for controlling said damper, wherein the diagnostic method is carried out in at least one conduit and comprises the following steps:

step A: providing at least one measuring device designed to measure the intake and outlet airflow from the damper in each conduit, said measuring device being controlled by the control unit, step B: blocking off the vents of the conduit to be tested, step C: turning on the blower at a determined operating pressure, step D: measuring the airflow of the conduit by means of the measuring device, step E: determining the actual load loss of the damper, step F: determining the actual pressure of the conduit by subtracting the actual load loss of the damper from the determined operating pressure applied at the blower, step G: determining the leakage flow rate value of the conduit based on the actual pressure of the conduit determined in step F and from the airflow of the conduit measured in step D.

2. Diagnostic method according to claim 1, wherein the method comprises the following additional steps:

step H: turning on the blower at a specific operating pressure, step I: repeating steps D, E, F, and G step K: determining an equation characterizing the permeability of the conduit from the different leakage flow rate values obtained in each repetition of step G.

3. Diagnostic method according to claim 2, wherein the method is performed for each conduit of the ventilation system and comprises a step K' of identifying the permeability class of the ventilation system from the permeability equation of each conduit produced in step K and from the dimensions of each conduit.

4. Diagnostic method according to claim 1, wherein the method comprises the following additional steps:

step L: opening the vent or vents of the conduit to be tested, or verifying that the vent or vents of the conduit are open, step M: sending a setting to a damper of the conduit to be tested, corresponding to a theoretical total flow rate of the conduit, step N: determining a theoretical operating pressure of the ventilation unit by adding to a theoretical pressure of the conduit subject to the theoretical total flow rate of the conduit according to step M, a theoretical load loss of the damper of said conduit not subject to the theoretical total flow rate of the conduit, step O: turning on the blower so as to reach the theoretical total flow rate of the conduit and the theoretical operating pressure of the ventilation unit, step P: comparing the actual load loss of the damper as determined in step E with the theoretical load loss of the damper; when the actual load loss of the damper is less than the theoretical load loss, a defect in the vents of the tested conduit or in the conduit is identified.

5. Diagnostic method according to claim 4, wherein the diagnostic method comprises the following additional steps:

step Q: sending another setting corresponding to the theoretical total flow rate of the conduit according to step M, to which is added a leakage flow rate determined in step G or K subject to the specific theoretical pressure of the conduit according to step N, step R: repeating steps N and Q until a balance between the theoretical pressure of the conduit and the theoretical total flow rate of the conduit is reached, steps Q and R are performed successively between steps N and O.

6. Diagnostic method according to claim 1, wherein the method is performed for a system of conduits of the ventilation system, each conduit of the system being diagnosed independently.

7. Diagnostic method according to claim 1, wherein the method comprises an evaluation of the discharge of the ventilation unit by verifying that a theoretical total flow rate is obtained at the ventilation unit as compared to a predetermined theoretical total flow rate.

8. Ventilation unit comprising at least a blower, a discharge conduit, a system of conduits comprising at least two conduits, each comprising at least one air extraction and/or intake vent, at least one damper positioned in each conduit, a control unit adapted for controlling said damper, characterized in that the ventilation unit comprises at least one measuring device designed to measure the air intake or outlet flow rate of the damper of each conduit, said measuring device being controlled by the control unit.

9. Ventilation unit according to claim 8, wherein at least one measuring device is incorporated in each damper.

10. Ventilation unit according to claim 8, wherein the measuring device is a flow meter.

* * * * *